(12) United States Patent
Ranade

(10) Patent No.: US 10,176,055 B1
(45) Date of Patent: Jan. 8, 2019

(54) SYSTEMS AND METHODS FOR GENERATING FULL BACKUPS OF APPLICATIONS

(71) Applicant: Veritas Technologies LLC, Mountain View, CA (US)

(72) Inventor: Sameer Ranade, Pune (IN)

(73) Assignee: Veritas Technologies LLC, Mountain View, CA (US)

(*) Notice: Subject to any disclaimer, the term of this patent is extended or adjusted under 35 U.S.C. 154(b) by 320 days.

(21) Appl. No.: 14/936,705

(22) Filed: Nov. 10, 2015

(51) Int. Cl.
*G06F 17/30* (2006.01)
*G06F 11/14* (2006.01)

(52) U.S. Cl.
CPC ...... *G06F 11/1464* (2013.01); *G06F 11/1451* (2013.01)

(58) Field of Classification Search
CPC .................. G06F 11/1469; G06F 11/1451
See application file for complete search history.

(56) References Cited

U.S. PATENT DOCUMENTS

| | | | | |
|---|---|---|---|---|
| 9,026,496 B1* | 5/2015 | Bachu | ............... | G06F 11/1448 707/640 |
| 9,075,819 B1* | 7/2015 | Escabi, II | ......... | G06F 17/30162 |
| 2005/0033755 A1* | 2/2005 | Gokhale | ............... | G06F 3/0608 |
| 2014/0095816 A1* | 4/2014 | Hsu | ....................... | G06F 3/0655 711/162 |
| 2016/0077925 A1* | 3/2016 | Tekade | ............... | G06F 11/1456 707/654 |

OTHER PUBLICATIONS

Ashutosh Bahadure; Systems and Methods for Enabling Efficient Access to Incremental Backups; U.S. Appl. No. 13/873,211, filed Apr. 29, 2013.
"Changed Block Tracking (CBT) on virtual machines (1020128)", http://kb.vmware.com/selfservice/microsites/search.do?language=en_US&cmd=displayKC&externalId=1020128, as accessed Oct. 8, 2015, VMware Knowledge Base, (Jan. 29, 2011).
"NetBackup Enterprise backup and recovery", https://www.veritas.com/product/backup-and-recovery/netbackup, as accessed Oct. 8, 2015, Veritas Technologies LLC, (On or before Oct. 8, 2015).

(Continued)

*Primary Examiner* — Hung Q Pham
(74) *Attorney, Agent, or Firm* — FisherBroyles LLP

(57) ABSTRACT

The disclosed computer-implemented method for generating full backups of applications may include (1) storing, at a backup server that is remote from an application, an initial full backup of the application that indicates an initial version of each data block within the application, (2) after storing the full backup of the application, receiving, from the application, an incremental log file generated by the application that indicates at least one change made to a data block within the application after the initial full backup of the application was generated, and (3) creating, by applying the change made to the data block within the application to the initial full backup of the application, an updated full backup of the application that indicates the most current version of each data block within the application. Various other methods, systems, and computer-readable media are also disclosed.

20 Claims, 7 Drawing Sheets

(56) References Cited

OTHER PUBLICATIONS

"Microsoft Exchange", https://products.office.com/en-us/exchange/email, as accessed Oct. 8, 2015, (Oct. 18, 2014).
"Microsoft SQL Server 2014", https://www.microsoft.com/en-us/server-cloud/products/sql-server/, as accessed Oct. 8, 2015, (Mar. 13, 2014).
"What is SharePoint?", https://support.office.com/en-us/article/What-is-SharePoint-97b915e6-651b-43b2-827d-fb25777f446f, as accessed Oct. 8, 2015, Microsoft, (Apr. 14, 2015).

* cited by examiner

US 10,176,055 B1

SYSTEMS AND METHODS FOR GENERATING FULL BACKUPS OF APPLICATIONS

BACKGROUND

Recovering large sets of digitally-stored data is an increasingly important task for organizations. To protect against data loss, an organization may use a backup system to back up important data. Traditional backup systems may generate recovery log files during each incremental backup that indicate which portions of a data set have changed during the incremental backup. Such backup systems may then later use these incremental recovery log files to recreate the data set as it was at a previous time. For example, a conventional backup technology may synthesize a previous version of a data volume based on information indicating which blocks within the data volume have changed since the previous version was created.

Unfortunately, these techniques may be ineffective and/or inefficient when applied to certain types of files or data. For example, creating full backups and/or synthesizing previous versions of data sets (e.g., by updating and/or reverting data blocks at a file system level) may only be successful for data volumes (e.g., databases). Such techniques may not work for applications, as applications may store data in multiple files across multiple levels of storage. The instant disclosure, therefore, identifies and addresses a need for improved systems and methods for generating full backups of applications.

SUMMARY

As will be described in greater detail below, the instant disclosure describes various systems and methods for generating full backups of applications by updating previous full backups of an application based on incremental log files that indicate recent changes made to portions of the application. The systems and methods described herein may then use the updated full backups to recover previous states of the application.

In one example, a computer-implemented method for generating full backups of applications may include (1) storing, at a backup server that is remote from an application, an initial full backup of the application that indicates an initial version of each data block within the application, (2) after storing the full backup of the application, receiving, from the application, an incremental log file generated by the application that indicates at least one change made to a data block within the application after the initial full backup of the application was generated, and (3) creating, by applying the change made to the data block within the application to the initial full backup of the application, an updated full backup of the application that indicates the most current version of each data block within the application.

In some examples, creating the updated full backup of the application may include applying the change made to the data block to a copy of the initial full backup of the application such that the initial full backup of the application is not overwritten. The method may then include storing both the updated full backup of the application and the initial full backup of the application. In these examples, the method may further include receiving an additional incremental log file generated by the application that indicates at least one additional change made to a data block within the application after the updated full backup of the application was created. After the additional incremental log file is received, the method may include creating a most-recently updated full backup of the application by applying the additional change made to the data block to a copy of the updated full backup of the application and then storing the most-recently updated full backup of the application in addition to the initial full backup and the updated full backup.

In other examples, creating the updated full backup of the application may include overwriting the initial full backup of the application based on the change made to the data block within the application. The method may also include storing an indication of the change made to the data block within the application. In these examples, the method may further include receiving a request to obtain a version of the application as the application was when the initial full backup of the application was generated. In response to the request, the method may include using the stored indication of the change made to the data block to return the updated full backup of the application to a state that represents the version of the application as the application was when the initial full backup of the application was generated.

In various examples, the method may also include receiving, from the application, an additional incremental log file generated by the application that indicates at least one additional change made to a data block within the application after the updated full backup of the application was created. The method may then include creating a most-recently updated full backup of the application by overwriting the updated full backup of the application based on the additional change made to the data block within the application. Furthermore, the method may include storing an indication of the additional change made to the data block within the application.

In some embodiments, the backup server that stores the initial full backup of the application may run an operating system that is not compatible with an operating system that executes the application. In such embodiments, creating the updated full backup of the application may be performed at a proxy server that runs an operating system that is compatible with the operating system that executes the application. Furthermore, in some examples, creating the updated full backup of the application may include utilizing at least one application program interface (API) to apply the change made to the data block within the application to the initial full backup of the application.

In one embodiment, a system for implementing the above-described method may include (1) a storage module that stores, at a backup server that is remote from an application, an initial full backup of the application that indicates an initial version of each data block within the application, (2) a reception module, that receives, from the application, after the full backup of the application is stored, an incremental log file generated by the application that indicates at least one change made to a data block within the application after the initial full backup of the application was generated, and (3) a creation module that creates, by applying the change made to the data block within the application to the initial full backup of the application, an updated full backup of the application that indicates the most current version of each data block within the application. In addition, the system may include at least one hardware processor configured to execute the storage module, the reception module, and the creation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) store, at a backup server that is remote from an application, an initial full backup of the application that indicates an initial version of each data block within the application, (2) after storing the full backup of the application, receive, from the application, an incremental log file generated by the application that indicates at least one change made to a data block within the application after the initial full backup of the application was generated, and (3) create, by applying the change made to the data block within the application to the initial full backup of the application, an updated full backup of the application that indicates the most current version of each data block within the application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
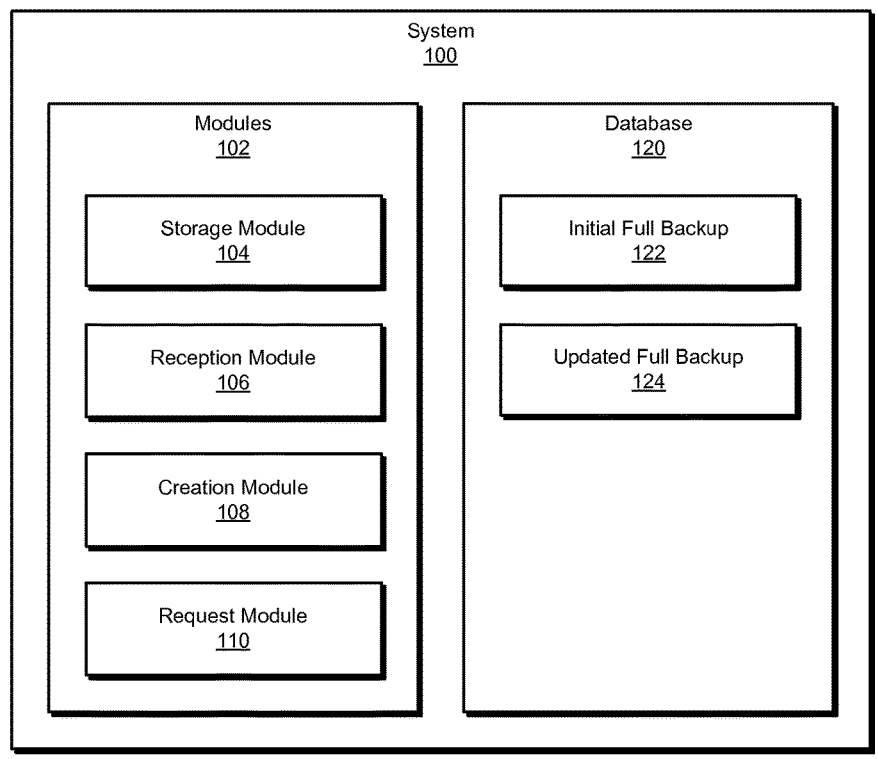
FIG. 1 is a block diagram of an exemplary system for generating full backups of applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating full backups of applications. As will be explained in greater detail below, by receiving incremental log files generated by an application that indicate changes made to data blocks within the application, the systems and methods described herein may update previous full backups of the application based on the indicated changes. Specifically, the disclosed systems and methods may replay incremental log files on top of full backups of an application to recreate the most current version of the entirety of the application. Furthermore, by generating such full backups of applications, the disclosed systems and methods may quickly and efficiently recover various states of the applications at previous points in time.

The following will provide, with reference to FIGS. 1, 2, 4, and 5, detailed descriptions of exemplary systems for generating full backups of applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for generating full backups of applications. As illustrated in this figure, exemplary system 100 may include one or more modules 102 for performing one or more tasks. For example, and as will be explained in greater detail below, exemplary system 100 may include a storage module 104 that stores, at a backup server that is remote from an application, an initial full backup of the application that indicates an initial version of each data block within the application. Exemplary system 100 may also include a reception module 106 that receives, from the application, after the initial full backup of the application has been stored, an incremental log file generated by the application that indicates at least one change made to a data block within the application after the initial full backup of the application was generated.

In addition, and as will be described in greater detail below, exemplary system 100 may include a creation module 108 that creates, by applying the change made to the data block within the application to the initial full backup of the application, an updated full backup of the application that indicates the most current version of each data block within the application. Finally, exemplary system 100 may include a request module 110 that receives and fulfills requests to obtain versions of the application as the application was at various points in time. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or backup server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. Database 120 may represent portions of a single database or computing device or a plurality of databases or computing devices. For example, database 120 may represent a portion of backup server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as backup server 206 in FIG. 2, computing system 610 in FIG. 6, and/or portions of exemplary network architecture 700 in FIG. 7.

In one example, database 120 may be configured to store one or more full backups of applications, such as initial full backup 122 and updated full backup 124. The terms "full backup of an application" and "full backup," as used herein, generally refer to any type or form of re-creation or representation of the entirety of an application as the application was at a specific point in time. For example, a full backup of an application may consist of a copy of each data block within the application as the data blocks were at a particular point in time.

In addition, the term "initial full backup of an application," as used herein, generally refers to any full backup that indicates an original or preliminary state of the application. For example, an initial full backup of an application may represent the state of the application immediately after the application was created (e.g., before the application underwent any changes or received any input). Additionally or alternatively, an initial full backup of an application may represent the first full backup of the application generated by the application and/or received by a backup server. Furthermore, the term "updated full backup of an application," as used herein, generally refers to any full backup that indicates a new state of an application after the application has undergone one or more changes (e.g., after an initial full backup of the application was generated).

Additionally, the term "application," as used herein, generally refers to any type or form of collection of files, software, or executable code configured to provide one or more services or complete one or more tasks. In some examples, the data or files of an application may be composed of multiple data blocks (e.g., small units or segments of data). Examples of applications include, without limitation, media applications, messaging applications, gaming applications, security applications, cloud-based applications, work-related applications, applications downloaded onto personal computing devices, applications hosted across multiple servers, variations of one or more of the same, combinations of one or more of the same, and/or any additional type of application. In an exemplary embodiment, the systems described herein may backup and recover data associated with applications that handle large amounts of user data, such as MICROSOFT EXCHANGE and MICROSOFT SHAREPOINT.

Figure 2:
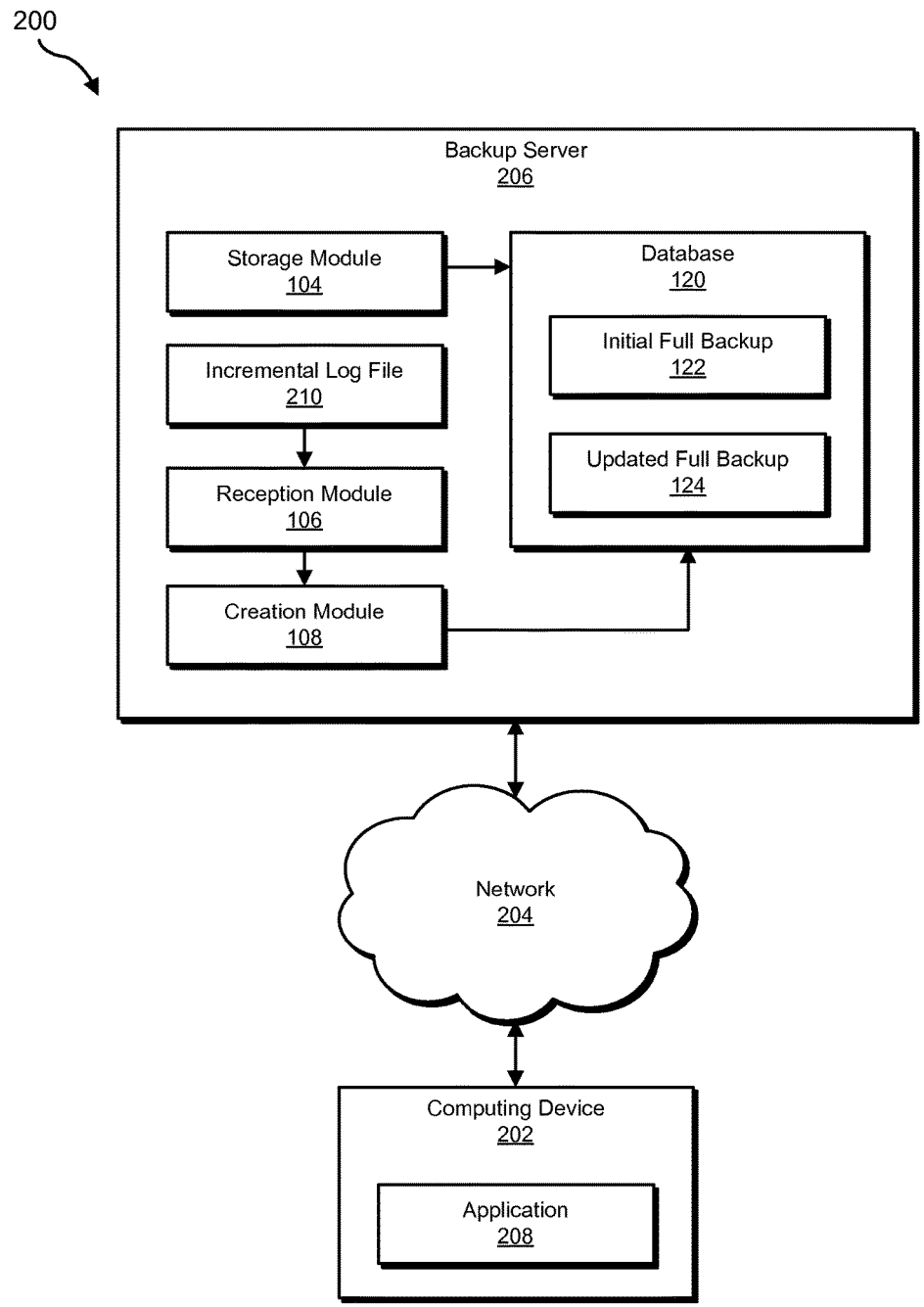
FIG. 2 is a block diagram of an additional exemplary system for generating full backups of applications.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a backup server 206 via a network 204. In the example of FIG. 2, backup server 206 may be programmed with one or more of modules 102 and/or may store all or a portion of the data in database 120. In this example, backup server 206 may operate a server-side backup service configured to backup and/or recover data stored within one or more applications, such as application 208 hosted on computing device 202. In other examples, at least a portion of the systems described herein may operate client-side on computing device 202. In these examples, computing device 202 may be programmed with one or more of modules 102 and/or may store all or a portion of the data in database 120.

In one embodiment, one or more of modules 102 from FIG. 1 may, when executed by at least one processor of backup server 206, enable backup server 206 to generate full backups of applications. For example, and as will be described in greater detail below, storage module 104 may cause backup server 206 to store, at backup server 206, initial full backup 122 of application 208 that indicates an initial version of each data block within application 208. In addition, reception module 106 may cause backup server 206 to receive, from application 208, an incremental log file 210 generated by application 208 that indicates at least one change made to a data block within application 208 after initial full backup 122 was generated. Finally, creation module 108 may cause backup server 206 to create, by applying the change made to the data block within application 208 to initial full backup 122, updated full backup 124 of application 208 that indicates the most current version of each data block within application 208.

Computing device 202 generally represents any type or form of computing device capable of hosting, executing, and/or storing one or more applications. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Backup server 206 generally represents any type or form of computing device that is capable of storing, recovering, and/or generating full backups of applications. Examples of backup server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and backup server 206.

Figure 3:
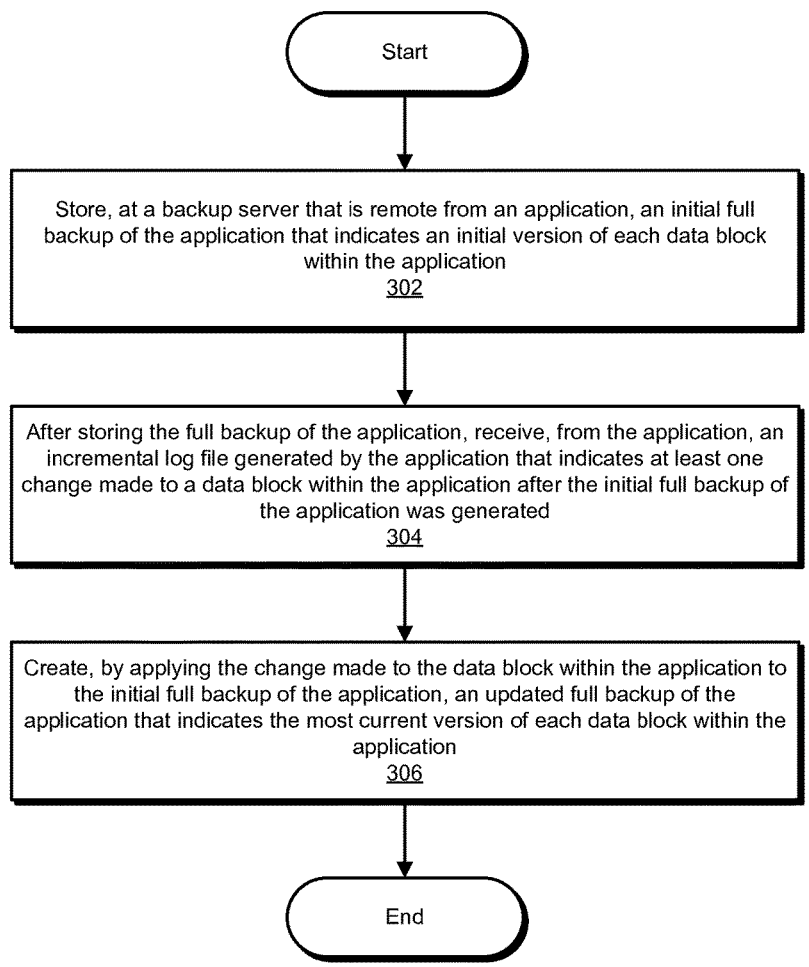
FIG. 3 is a flow diagram of an exemplary method for generating full backups of applications.

FIG. 3 is a flow diagram of an exemplary computer-implemented method 300 for generating full backups of applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may store, at a backup server that is remote from an application, an initial full backup of the application that indicates an initial version of each data block within the application. For example, storage module 104 may, as part of backup server 206 in FIG. 2, store initial full backup 122 of application 208 at backup server 206.

The systems described herein may store an initial full backup of an application in a variety of ways. In some examples, storage module 104 may receive an initial full backup of an application as part of a request by a user and/or administrator of the application to store the initial full backup of the application. For example, the user or administrator of the application may send the initial full backup of the application to storage module 104 after subscribing to a backup service that implements modules 102.

After receiving an initial full backup of an application, storage module 104 may store the initial full backup in a database (e.g., database 120) within and/or in communication with a backup server (e.g., backup server 206). Storage module 104 may store an initial full backup using any of a variety of types of storage, such as a physical hard drive, a virtual hard drive, and/or a portion of fast-access memory. Notably, the initial full backups stored by the systems described herein may represent the entirety of an application, including multiple types of files, directories, user information, and/or additional types of data within applications. As such, the systems described herein may store complex, multi-layered files and data sets, rather than simple databases or data volumes handled by traditional data recovery systems.

Returning to FIG. 3, at step 304 one or more of the systems described herein may receive, from the application, after storing the full backup of the application, an incremental log file generated by the application that indicates at least one change made to a data block within the application after the initial full backup of the application was generated. For example, after initial full backup 122 is stored, reception module 106 may, as part of backup server 206 in FIG. 2, receive incremental log file 210 from application 208.

The term "incremental log file," as used herein, generally refers to any type or form of summary, report, or indication of one or more changes made to data stored within one or more files (e.g., the files that constitute an application). In some examples, an incremental log file may indicate which data blocks within an application have changed, as well as the new values of the data blocks. In particular, an incremental log file may describe any and/or all changes made to an application after an initial full backup of the application was generated (or a previous incremental log file was generated). In addition, an application may generate a log file for itself (e.g., as opposed to an external application or other entity generating the log file).

The systems described herein may receive an incremental log file from an application in a variety of ways. In some examples, an application may periodically (e.g., at predetermined intervals) send incremental log files to reception module 106 that indicate all of the changes made to the application since the last incremental log file or full backup of the application was generated. Additionally or alternatively, reception module 106 may receive an incremental log file as part of a request by a user or administrator of an application to generate an updated full backup of the application.

Returning to FIG. 3, at step 306 one or more of the systems described herein may create, by applying the change made to the data block within the application to the initial full backup of the application, an updated full backup of the application that indicates the most current version of each data block within the application. For example, creation module 108 may, as part of backup server 206 in FIG. 2, create updated full backup 124 by applying the change made to the data block within application 208 to initial full backup 122.

The systems described herein may create an updated full backup of an application in a variety of ways. In some examples, creation module 108 may analyze an incremental log file generated by an application to identify each change made to the application described by the incremental log file. For example, creation module 108 may determine that an incremental log file indicates that values of a certain number of data blocks within an application were changed, as well as the new values of the data blocks. Creation module 108 may then apply the changes to an initial full backup of the application to create an updated full backup of the application. After this process, the updated full backup of the application may represent the state of each data block within the application as the data blocks were at the time the incremental log file was generated.

In some examples, creation module 108 may apply changes to an initial full backup of an application by "replaying" an incremental log file on top of the initial full backup. For example, instead of creating an updated full backup at a filesystem level of a backup server (as may be done by traditional backup systems that backup data volumes), the systems described herein may create updated full backups of entire applications by applying incremental changes to previous full backups in memory (e.g., a cache) or other layers of storage. Specifically, in some embodiments, creation module 108 may apply incremental changes to full backups using one or more APIs that facilitate communication between an incremental log file and a file that stores a full backup.

Furthermore, in some examples, creation module 108 may utilize a proxy server (e.g., a server in addition to backup server 206) to perform one or more steps involved in creating updated full backups of applications. The term "proxy server," as used herein, generally refers to any type or form of physical or virtual server that is distinct from a backup server and in communication with the backup server via a network or other communication infrastructure.

In some embodiments, the systems described herein may implement a proxy server that runs a different operating system than a backup server used to store full backups of applications. For example, one or more applications that the systems described herein may be tasked to backup (e.g., MICROSOFT EXCHANGE, MICROSOFT SHAREPOINT, etc.) may be configured to run within a certain operating system or set of operating systems (e.g., WINDOWS operating systems). On the other hand, the backup servers described herein may run a different or incompatible operating system (e.g., a UNIX operating system). In order to accurately and/or efficiently replay incremental log files on top of full backups of applications, the systems described herein may recreate the operating system environment in which the applications are configured to run. For example, after receiving an incremental log file generated by an application at a backup server, the systems described herein may forward the incremental log file and an initial full backup of the application (stored at the backup server) to a proxy server that runs an operating system compatible with the application. Creation module 108, employed at the proxy server, may then create an updated full backup of the application. After the updated full backup is created, creation module 108 may send the updated full backup to the backup server to be stored within the backup server.

The systems described herein may generate and store full backups of applications in a variety of ways to meet the needs of various users and/or administrators of applications. In one example, an administrator of an application may wish to retain full backups of the application that describe each incremental change (or set of incremental changes) made to the application. In this example, the systems described herein may generate and store an updated full backup of the application after receiving each incremental log file generated by the application. Specifically, creation module 108 may apply the changes indicated by an incremental log file to a copy of the most-recently created full backup of the application. In this way, storage module 104 may store the mostly-recently updated full backup, as well as all previously-created full backups.

Figure 4:
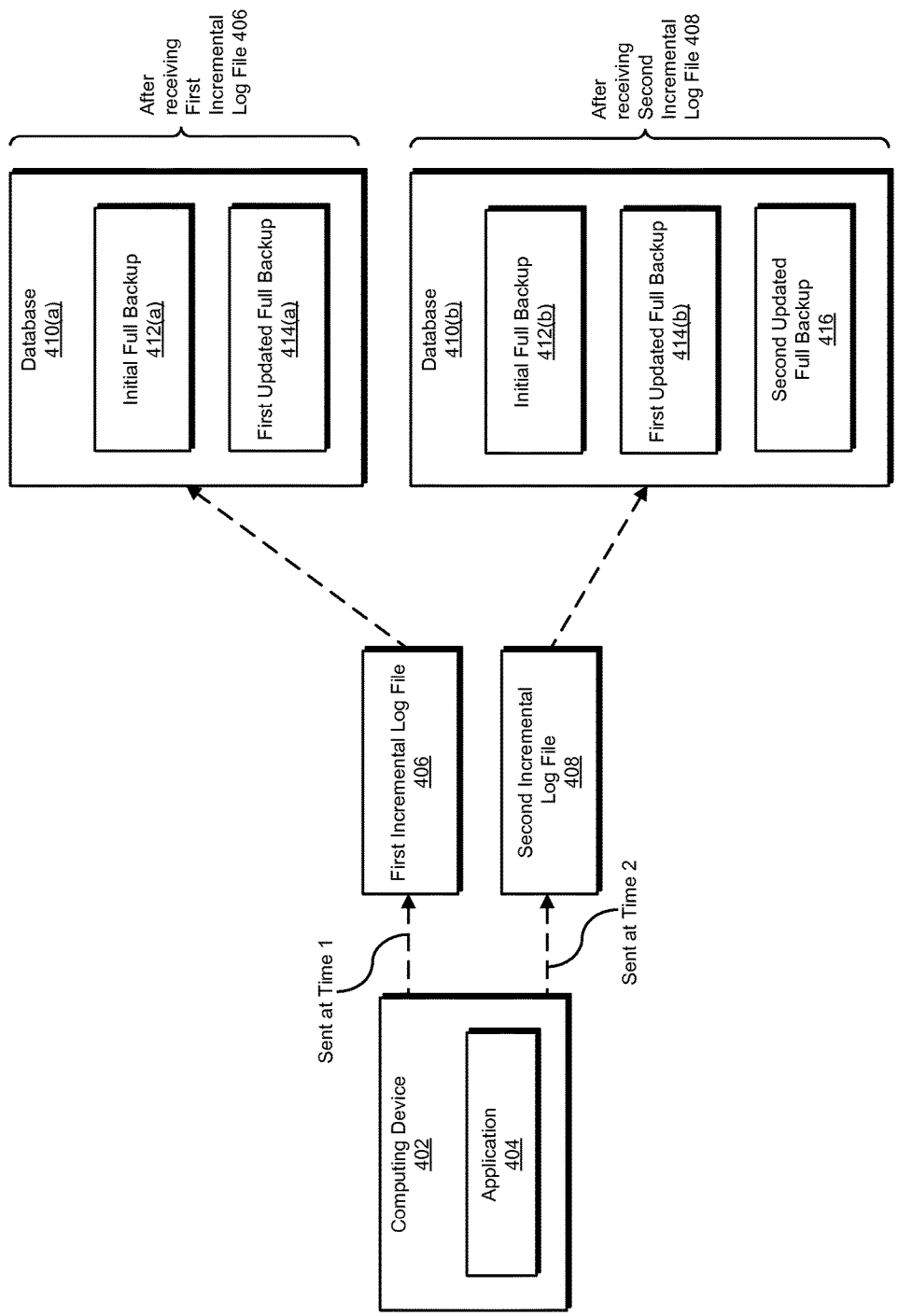
FIG. 4 is a block diagram of an exemplary process of generating full backups of applications.

FIG. 4 illustrates an exemplary process of generating and storing multiple full backups of an application. In this example, a computing device 402 may host an application 404. In addition, a database 410 (represented in FIG. 4 as database 410(a) and 410(b), describing database 410 at different points in time) may be in communication with computing device 402 and tasked with handling backup and recovery services for application 404. In one example, computing device 402 may send an initial full backup 412 to database 410 (shown in database 410(a) and 410(b) as initial full backup 412(a) and 412(b), respectively). At some point after initial full backup 412 is generated (e.g., at a "time 1," as illustrated in FIG. 4), computing device 402 may send a first incremental log file 406 to database 410. After database 410 receives first incremental log file 406, creation module 108 may apply the changes indicated within first incremental log file 406 to a copy of initial full backup 412. As such, creation module 108 may create a first updated full backup 414, while not overwriting initial full backup 412. As shown in FIG. 4, database 410(a) (representing the state of database 410 after receiving and analyzing first incremental log file 406) may include initial full backup 412(a) and first updated full backup 414(a).

At some point after receiving first incremental log file 406 (e.g., at a "time 2," as illustrated in FIG. 4), computing device 402 may send a second incremental log file 408 to database 410. After database 410 receives second incremental log file 408, creation module 108 may apply the changes indicated within second incremental log file 408 to a copy of first updated full backup 414. As such, creation module 108 may create a second updated full backup 416, while not overwriting first updated full backup 414. As shown in FIG. 4, database 410(b) (representing the state of database 410 after receiving and analyzing second incremental log file 408) may include initial full backup 412(b), first updated full backup 414(b), and second updated full backup 416. In other words, database 410 may store a full backup of each distinct state of application 404 as described by the incremental log files generated by application 404. As such, the systems described herein may quickly and efficiently fulfill requests to obtain recovered versions of each distinct state of application 404.

In other examples, a user or administrator of an application may be uninterested in and/or less likely to request recovered versions of previous states of an application. For example, an administrator may generally only wish to access the most recently-updated version of an application. In these examples, the systems described herein may update (e.g., overwrite) each full backup of an application after receiving an incremental log file, while retaining information sufficient to recover previous states of the application if necessary.

Figure 5:
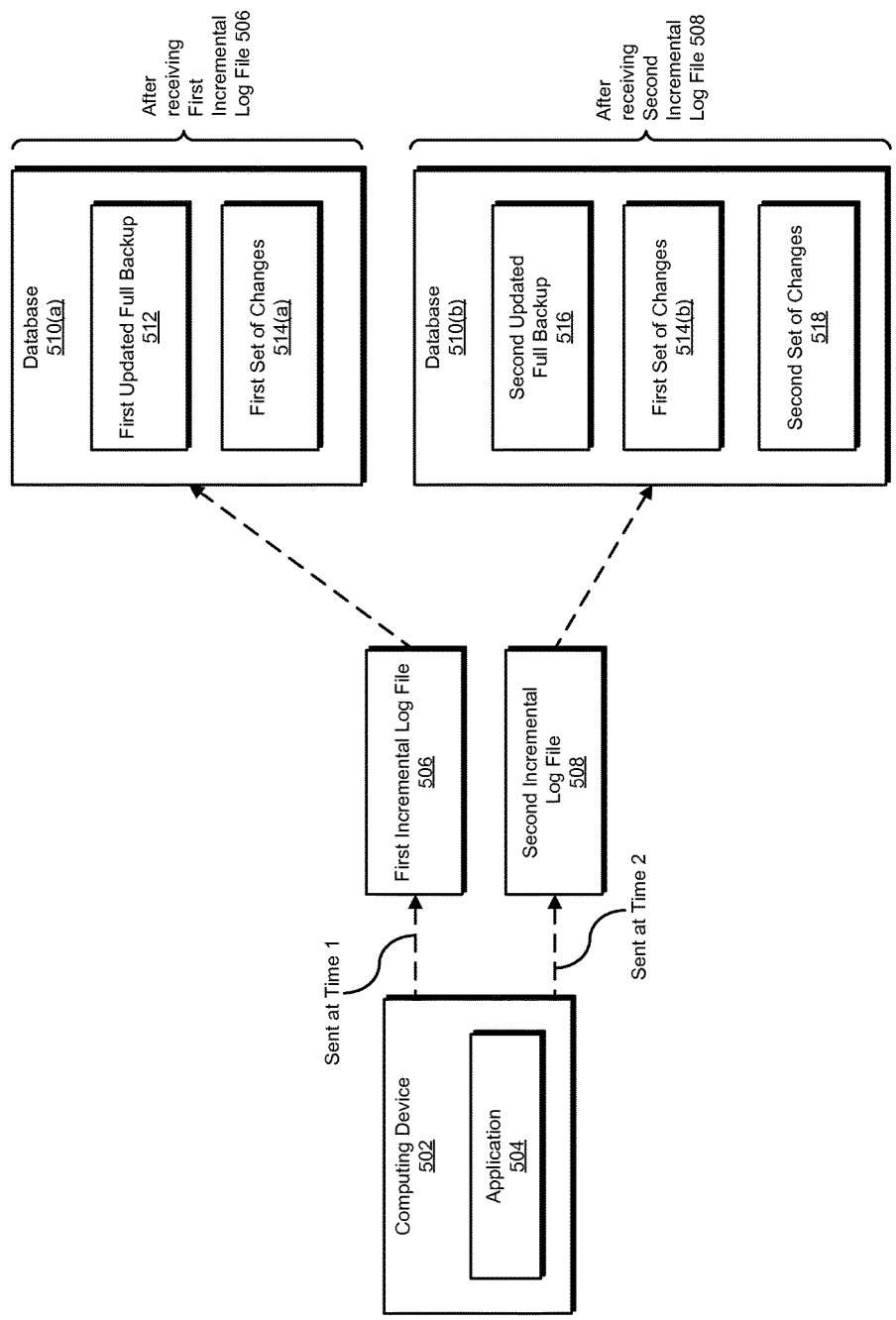
FIG. 5 is a block diagram of an additional exemplary process of generating full backups of applications.

FIG. 5 illustrates an exemplary process of updating full backups of an application. In this example, a computing device 502 may host an application 504. In addition, a database 510 (represented in FIG. 5 as database 510(a) and 510(b), describing database 510 at different points in time) may be in communication with computing device 502 and tasked with handling backup and recovery processes for application 504. In one example, computing device 502 may send an initial full backup of application 504 (not shown within FIG. 5) to database 510. At some point after the initial full backup is generated (e.g., at a "time 1," as illustrated within FIG. 5), computing device 502 may send a first incremental log file 506 to database 510. After database 510 receives first incremental log file 506, creation module 108 may apply the changes indicated within first incremental log file 506 directly to the initial full backup. In doing so, creation module 108 may overwrite the initial full backup and create a first updated full backup 512.

In addition to creating first updated full backup 512, creation module 108 may create a first set of changes 514. First set of changes 514 may represent each change applied to the initial full backup of application 504 to create first updated full backup 512. For example, first set of changes 514 may include or represent first incremental log file 506. In addition, first set of changes 514 may include the original value of each data block that was changed while creating first updated full backup 512. As will be explained in greater detail below, first set of changes 514 may be used to recover the state of application 504 as application 504 was at the time the initial full backup was generated. After creation module 108 creates first updated full backup 512 and first set of changes 514, storage module 104 may store these files within database 510. For example, as shown in FIG. 5, database 510(a) (representing the state of database 510 after receiving and analyzing first incremental log file 506) may include first updated full backup 512 and first set of changes 514(a).

At some point after receiving incremental log file 506 (e.g., at a "time 2," as illustrated in FIG. 5), computing device 502 may send a second incremental log file 508 to database 510. After database 510 receives second incremental log file 508, creation module 108 may apply the changes indicated within second incremental log file 508 directly to first updated full backup 512. In doing so, creation module 108 may create a second updated full backup 516. In addition, creation module 108 may create a second set of changes 518 that represents each change described by second incremental log file 508. As shown in FIG. 5, database 510(b) (representing the state of database 510 after receiving and analyzing second incremental log file 508) may include second updated full backup 516, first set of changes 514(b), and second set of changes 518. Notably, the systems described herein may continue to store each set of changes generated after receiving an incremental log file, even while overwriting previous full backups. In addition, a set of changes may generally contain less data (and therefore require less storage space) than a full backup of an application.

In one example, database 510 in FIG. 5 may receive a request (e.g., from a user of application 504) to obtain a version of application 504 as application 504 was when first updated full backup 512 was created. In response to this request, request module 110 may use second set of changes 518 to return second updated full backup 516 (or a copy of second updated full backup 516) to a state equivalent to the state represented by first updated full backup 512. For example, request module 110 may identify, within second set of changes 518, the original value of each data block that was changed while second updated full backup 516 was created. Request module 110 may then revert each applicable data block within second updated full backup 516 to the identified values and distribute the recovered data to the user that requested the recovered data. In the event that request module 110 receives a request to obtain a version of application 504 as application 504 was when the initial full backup of application 504 was generated, request module 110 may implement a similar process that uses the information stored within first set of changes 514 to return the recovered version of first updated full backup 512 to an initial version of application 504.

As explained above in connection with FIGS. 3-5, a backup server may create updated full backups of applications based on changes indicated within incremental log files generated by the applications. The backup server may then use the updated full backups to recover and/or and provide versions of applications as the applications were at various points in time. For example, the backup server may immediately provide a full backup of an application upon request by storing each updated full backup of the application generated after receiving an incremental log file. In other examples, the backup server may store only the most recent full backup of an application and the incremental changes involved in previous backups, thereby reducing required storage space while still enabling the recovery of previous versions of the application.

Figure 6:
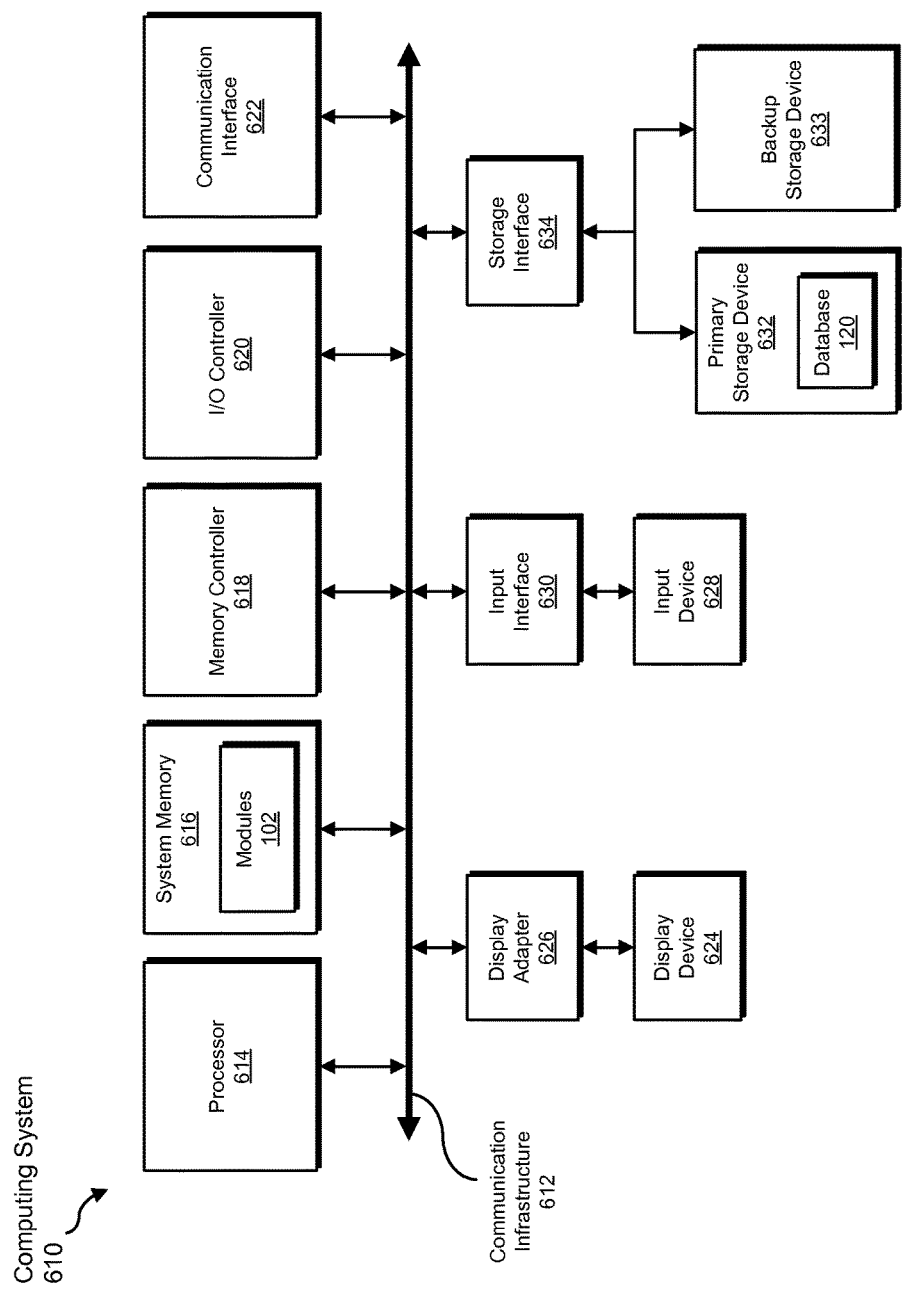
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
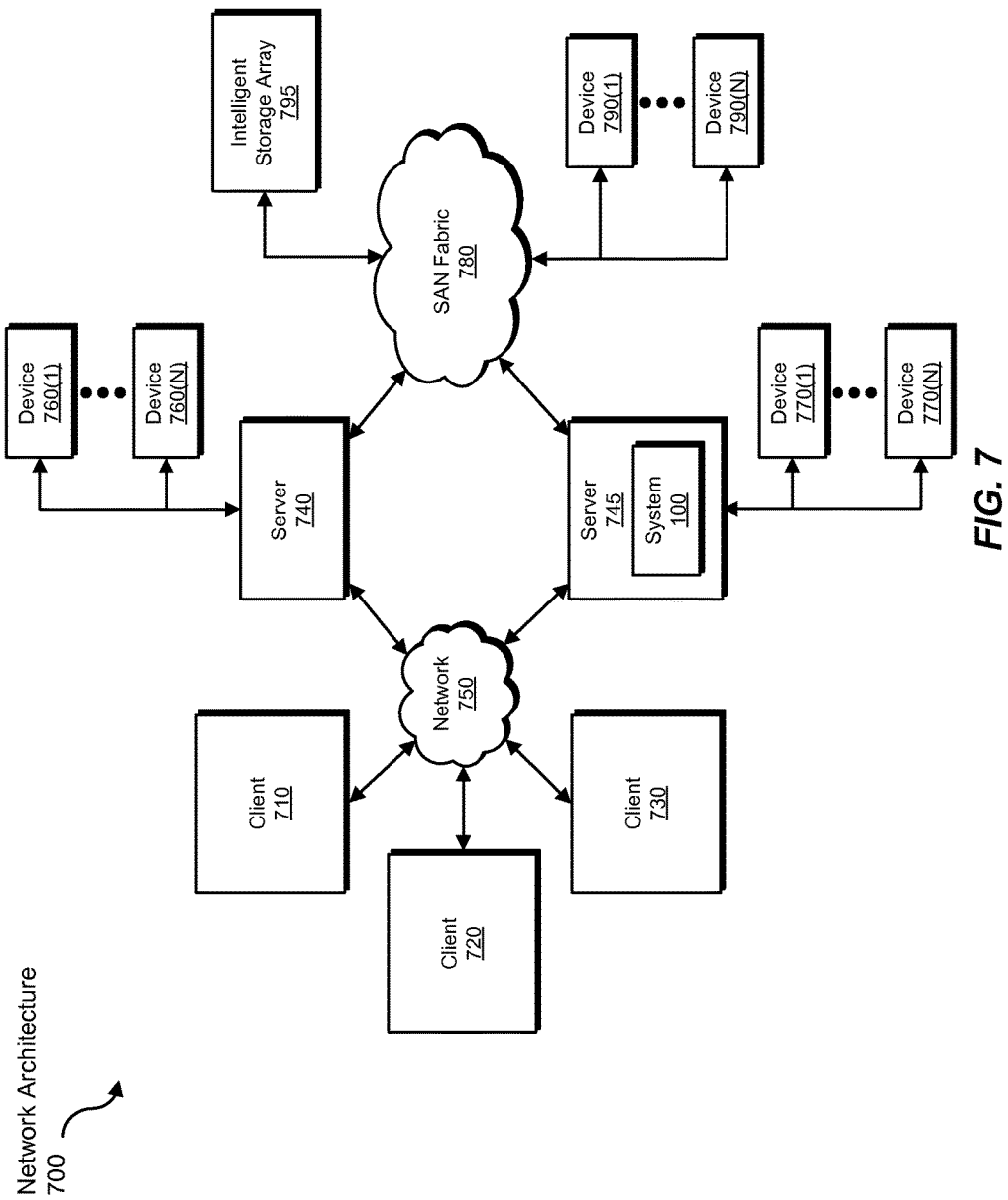
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for generating full backups of applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an initial full backup of an application to be transformed, transform the initial full backup into an updated full backup, output a result of the transformation to a user or administrator of the application, use the result of the transformation to backup and recover full versions of the application, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating full backups of applications, at least a portion of the method being performed by a computing device comprising at least one processor, the method comprising:
   storing, at a backup server that is remote from an application, an initial full backup of the application that indicates an initial version of each data block within the application;
   after storing the initial full backup of the application, receiving, from the application, an incremental log file generated by the application that indicates at least one change made to a corresponding data block within the application after the initial full backup of the application was generated; and
   creating an updated full backup of the application that indicates the most current version of each data block within the application by:
      replicating a computing environment in which the application is designed to run;
      loading a copy of the initial full backup of the application into a portion of fast-access memory within the replicated computing environment; and
      recreating the at least one change made to the corresponding data block within the copy of the initial full backup of the application by:
         identifying, based on the incremental log file, input provided to the application that resulted in the at least one change being made to the corresponding data block within the application; and
         providing, to the copy of the initial full backup of the application within the portion of fast-access memory within the replicated computing environment, the input that resulted in the at least one change being made to the corresponding data block within the application.

2. The method of claim 1, further comprising storing both the updated full backup of the application and the initial full backup of the application within the backup server.

3. The method of claim 2, further comprising:
   receiving an additional incremental log file generated by the application that indicates an additional change made to the corresponding data block within the application after the updated full backup of the application was created;
   creating a most-recently updated full backup of the application by recreating the additional change made to the corresponding data block within a copy of the updated full backup of the application; and
   storing the most-recently updated full backup of the application in addition to the initial full backup of the application and the updated full backup of the application.

4. The method of claim 1, further comprising storing an indication of the at least one change made to the corresponding data block within the application.

5. The method of claim 4, further comprising:
   receiving a request to obtain a version of the application as the application was when the initial full backup of the application was generated; and
   in response to the request, using the stored indication of the at least one change made to the corresponding data block to return the updated full backup of the application to a state that represents the version of the application as the application was when the initial full backup of the application was generated.

6. The method of claim 1, further comprising:
receiving, from the application, an additional incremental log file generated by the application that indicates an additional change made to the corresponding data block within the application after the updated full backup of the application was created;
creating a most-recently updated full backup of the application by overwriting the updated full backup of the application based on the additional change made to the corresponding data block within the application; and
storing an indication of the additional change made to the corresponding data block within the application.

7. The method of claim 1, wherein replicating the computing environment in which the application is designed to run comprises:
determining that the backup server that stores the initial full backup of the application runs an operating system that is not compatible with an operating system that executes the application; and
sending, in response to determining that the operating system run by the backup server is not compatible with the operating system that executes the application, at least a portion of the updated full backup of the application to a proxy server that runs an operating system that is compatible with the operating system that executes the application.

8. The method of claim 1, wherein creating the updated full backup of the application comprises utilizing at least one application program interface to recreate the at least one change made to the corresponding data block within the application within the copy of the initial full backup of the application.

9. The method of claim 1, wherein the portion of fast-access memory within the replicated computing environment is:
contained within the backup server; and
distinct from a portion of memory that stores a filesystem of the backup server.

10. The method of claim 1, wherein the portion of fast-access memory comprises a cache.

11. A system for generating full backups of applications, the system comprising:
a storage module, stored in memory, that stores, at a backup server that is remote from an application, an initial full backup of the application that indicates an initial version of each data block within the application;
a reception module, stored in memory, that receives, from the application, after the initial full backup of the application is stored, an incremental log file generated by the application that indicates at least one change made to a corresponding data block within the application after the initial full backup of the application was generated;
a creation module, stored in memory, that creates an updated full backup of the application that indicates the most current version of each data block within the application by:
replicating a computing environment in which the application is designed to run;
loading a copy of the initial full backup of the application into a portion of fast-access memory within the replicated computing environment; and
recreating the at least one change made to the corresponding data block within the copy of the initial full backup of the application by:
identifying, based on the incremental log file, input provided to the application that resulted in the at least one change being made to the corresponding data block within the application; and
providing, to the copy of the initial full backup within the portion of fast-access memory within the replicated computing environment, the input that resulted in the at least one change being made to the corresponding data block within the application; and
at least one hardware processor configured to execute the storage module, the reception module, and the creation module.

12. The system of claim 11, wherein the storage module stores both the updated full backup of the application and the initial full backup of the application within the backup server.

13. The system of claim 12, wherein:
the reception module further receives an additional incremental log file generated by the application that indicates an additional change made to the corresponding data block within the application after the updated full backup of the application was created;
the creation module further creates a most-recently updated full backup of the application by recreating the additional change made to the corresponding data block within a copy of the updated full backup of the application; and
the storage module further stores the most-recently updated full backup of the application in addition to the initial full backup of the application and the updated full backup of the application.

14. The system of claim 11, wherein the storage module further stores an indication of the at least one change made to the corresponding data block within the application.

15. The system of claim 14, further comprising a request module that:
receives a request to obtain a version of the application as the application was when the initial full backup of the application was generated; and
in response to the request, uses the stored indication of the at least one change made to the corresponding data block to return the updated full backup of the application to a state that represents the version of the application as the application was when the initial full backup of the application was generated.

16. The system of claim 11, wherein:
the reception module further receives, from the application, an additional incremental log file generated by the application that indicates an additional change made to the corresponding data block within the application after the updated full backup of the application was created;
the creation module further creates a most-recently updated full backup of the application by overwriting the updated full backup of the application based on the additional change made to the corresponding data block within the application; and
the storage module further stores an indication of the additional change made to the corresponding data block within the application.

17. The system of claim 11, wherein the creation module replicates the computing environment in which the application is designed to run by:

determining that the backup server that stores the initial full backup of the application runs an operating system that is not compatible with an operating system that executes the application; and sending, in response to determining that the operating system run by the backup server is not compatible with the operating system that executes the application, at least a portion of the updated full backup of the application to a proxy server that runs an operating system that is compatible with the operating system that executes the application.

18. The system of claim 11, wherein the creation module creates the updated full backup of the application by utilizing at least one application program interface to recreate the at least one change made to the corresponding data block within the application within the copy of the initial full backup of the application.

19. A non-transitory computer-readable medium comprising one or more computer-readable instructions that, when executed by at least one processor a computing device, cause the computing device to:

store, at a backup server that is remote from an application, an initial full backup of the application that indicates an initial version of each data block within the application;

after storing the initial full backup of the application, receive, from the application, an incremental log file generated by the application that indicates at least one change made to a corresponding data block within the application after the initial full backup of the application was generated; and create an updated full backup of the application that indicates the most current version of each data block within the application by:

replicating a computing environment in which the application is designed to run;

loading a copy of the initial full backup of the application into a portion of fast-access memory within the replicated computing environment; and recreating the at least one change made to the corresponding data block within the copy of the initial full backup of the application by:

identifying, based on the incremental log file, input provided to the application that resulted in the at least one change being made to the corresponding data block within the application; and providing, to the copy of the initial full backup within the portion of fast-access memory within the replicated computing environment, the input that resulted in the at least one change being made to the corresponding data block within the application.

20. The computer-readable medium of claim 19, wherein the one or more computer-readable instructions cause the computing device to store both the initial full backup of the application and the updated full backup of the application within the backup server.

\* \* \* \* \*